No. 700,111. Patented May 13, 1902.
V. ARCIONI.
ELECTRICAL MEASURING INSTRUMENT.
(Application filed July 25, 1901.)
(No Model.)
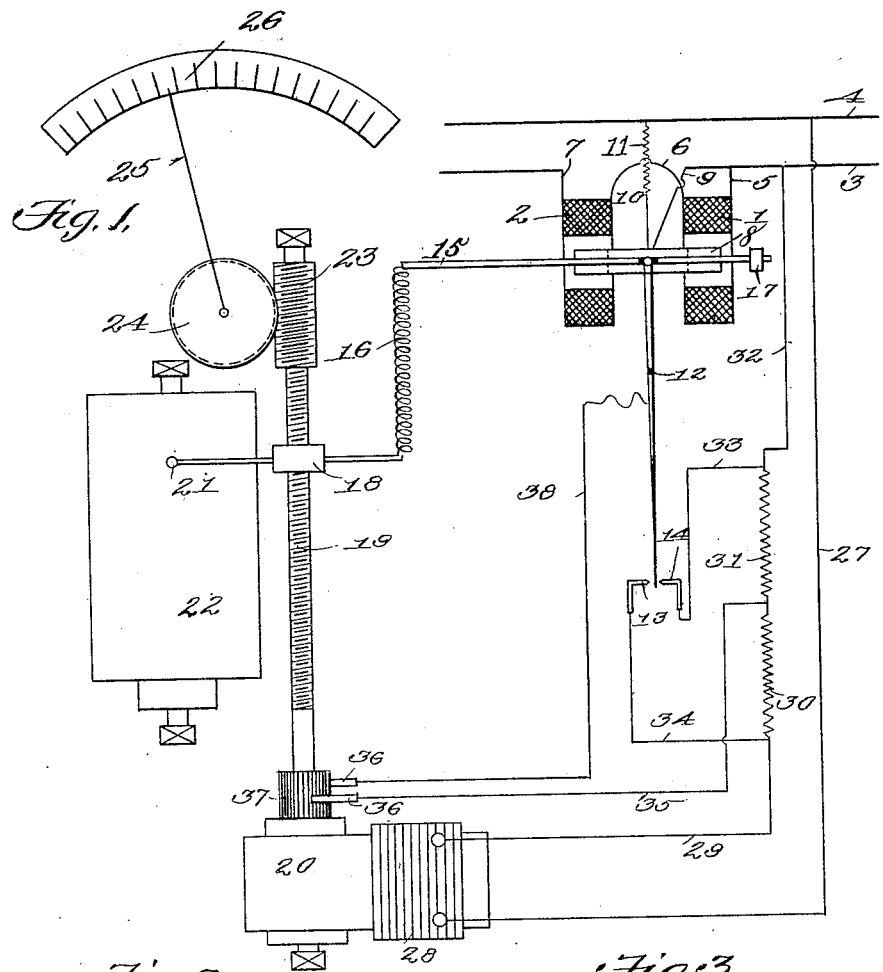
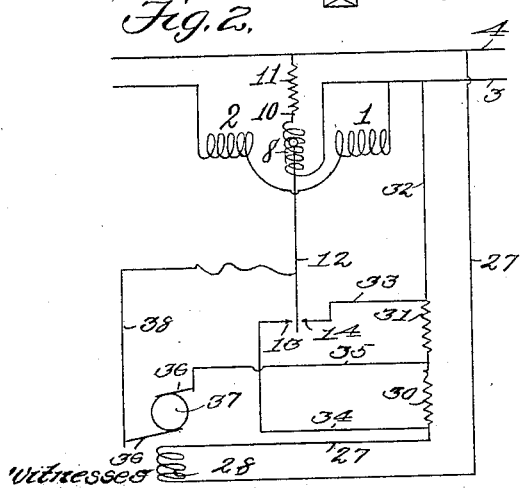
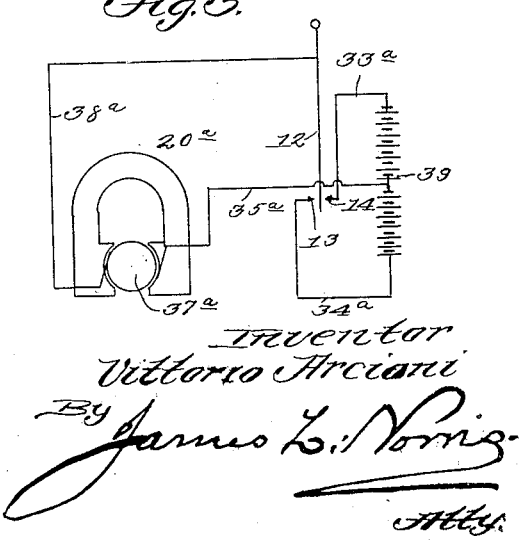
Inventor
Vittorio Arcioni
By James L. Norris
Atty.
Witnesses
Philip N. Tilden

UNITED STATES PATENT OFFICE.

VITTORIO ARCIONI, OF SPOLETA, ITALY, ASSIGNOR TO CAMILLO OLIVETTI, OF IVREA, ITALY.

ELECTRICAL MEASURING INSTRUMENT.

SPECIFICATION forming part of Letters Patent No. 700,111, dated May 13, 1902.

Application filed July 25, 1901. Serial No. 69,725. (No model.)

*To all whom it may concern:*

Be it known that I, VITTORIO ARCIONI, a subject of the King of Italy, residing at Spoleta, Italy, have invented certain new and useful Improvements in Electrical Measuring Instruments, of which the following is a specification.

My invention relates to electrical measuring instruments of that class in which a movable part acted upon by the current to be measured is normally maintained at the zero-point by a counterbalancing force which tends to neutralize the effect of the current on said movable part, which counterbalancing force is measured and gives the value of the current.

One of the chief objections to this class of inventions heretofore is that direct readings of the energy, potential, or other value of the current to be measured cannot be obtained.

The object of my invention is to provide improved means whereby a direct visual indication of a record may be obtained of the value of the current flowing in this class of instruments.

A further object of the invention is to provide a counterbalancing device for equalizing the action of the current on the movable part of the instrument and normally maintaining the same at the zero-point, novel means thrown into operation by said movable part for increasing or decreasing the tension of said counterbalancing device, and means for measuring the force exerted on said counterbalancing device.

A further object of the invention is to provide a motor having a novel adjustable connection with said counterbalancing device, means for automatically throwing said motor into operation in one direction or the other for increasing or decreasing the tension of said counterbalancing device, and indicating mechanism connected with said motor.

Other objects and advantages of the invention will hereinafter appear, and the novel features thereof will be set forth in the claims.

In the drawings forming part of this specification, Figure 1 is a view showing my improvements in elevation in connection with a wattmeter. Fig. 2 is a diagrammatic view showing the circuit connections between the line, the motor, the field-coils of the meter, and the armature thereof; and Fig. 3 is a diagrammatic view showing a modified arrangement in which the circuit connections through the motor lead from a source of current independent of the line.

Like reference-numerals indicate like parts in the different views.

While my invention has been illustrated as a wattmeter, I desire to be understood that the same is adapted for use without material change with any form of electrical measuring instrument.

The field-coils 1 and 2 are connected in series with the leg 3 of the line 3 4 through the wires 5, 6, and 7. The armature 8 is in shunt or parallel with the line 3 4 through the wires 9 and 10, the latter preferably including a resistance 11. The armature 8 constitutes the movable part of the meter and is capable of vibration upon a central pivot or support, due to the action of the current thereon. Connected with, but insulated from, the movable part 8 is a rod 12, of conducting material, which is movable between and adapted to form electrical contact with the contacts 13 and 14. These contacts are located very close together, so that the slightest movement of the rod 12 in one direction or the other will cause the engagement of the same with one or the other of said contacts. Secured to the movable part 8 and extending outwardly therefrom is an arm 15, to which is attached one end of a spring 16, constituting the counterbalancing device, as will hereinafter appear. The end of the arm 15 opposite that to which the spring 16 is attached is provided with an adjustable weight 17 for an obvious purpose. The spring 16 is connected at its opposite end to an internally-threaded collar or nut 18, mounted upon a threaded shaft 19, connected with, driven from, or forming part of the armature-shaft of the motor 20. The collar or nut 18 is incapable of turning movement on the shaft 19; but when said shaft rotates in one direction or the other the said collar or nut will be moved longitudinally thereof in one direction or the other. The motor 20 has been shown as a rotary electric motor; but any other suitable form of motor may be substituted for the same—that is to say, a mechanical motor may be employed in place of the electric motor, or a reciprocating or other motor may be substituted for the rotary motor, and even when the motor 20 is an electric motor it may be so constructed as to be operated by either a direct or alternating current. It is necessary, however, that said motor be capable of ready reversal, and it is important that it be so constructed that no dead-centers can occur. For the spring 16, which constitutes the counterbalancing device, I may also substitute a counterbalancing-weight or other equivalent mechanism. Connected with the collar or nut 18 is a pencil, pen, or other marking device 21, which lies in contact with a rotating drum or cylinder 22, the said marking device and the said cylinder constituting the recording mechanism for registering the movements of the collar 18. Secured to the shaft 19 is a worm 23, and meshing with said worm is a worm-wheel 24, which carries an indicating hand or pointer 25, which moves in front of a dial 26.

When no current is flowing through the instrument, the counterbalancing device 16 is so adjusted with respect to the armature 8 that the latter is maintained at the zero-point, and the rod 12, carried by the armature 8, is maintained at a point between the two contacts 13 and 14. This adjustment may be effected by means of the weight 17 on one end of the arm 15 or in any other suitable way. Now upon the passage of current from the line 3 4 through the instrument the tendency will be to deflect or turn the armature 8 in one direction or the other. This tendency of the armature or moving part 8 to turn will be resisted by the stress or tension of the counterbalancing device 16, which in the form shown in the drawings is a spring. The force required to be exerted on the spring 16 to return the armature or moving part 8 to its zero position will be equivalent to the energy or other value of the current to be measured, and by determining this force the energy or other value of the current is determined. By moving the collar 18, to which the spring 16 is attached, toward the motor 20 an increased tension is given to the spring 16, and the extent of movement of said collar 18 to overcome the action of the current on the moving part 8 will be proportional to or have a definite ratio to the energy or other value of the current to be measured. As this movement of the collar or nut 18 is obtained by the rotation of the shaft 19 and as said shaft is connected through the worm 23 and worm-wheel 24 with the hand or pointer 25, a visual indication on the dial 26 will be given by said hand 25, which will indicate the value of the current. As the pencil or other marking device 21 is directly connected with the collar or nut 18 and moves over the face of the drum or cylinder 22, a record of the value of the current flowing through the instrument will also be made by the recording mechanism.

To provide for the automatic rotation of the shaft 19 in one direction or the other to compensate for variations in the energy or other value of the current flowing through the instrument, I provide a normally closed shunt-circuit from the line, consisting of the wire 27, the field-magnet 28 of the motor 20, the wire 29, the non-inductive resistance-coils 30 and 31, and the wire 32. Leading from the contact-point 14 to the wire 32 at a point above the resistance-coil 31 is a wire 33, and leading from the contact-point 13 to the wire 29 at a point below the resistance-coil 30 is a wire 34. Leading from a point between the resistance-coils 30 and 31 is a wire 35, which through the brushes 36 and the commutator connects with the armature 37 of the motor 20, and connecting said armature with the rod 12 is a flexible wire 38. When there is a potential on the main line 3 4, there will be a flow of current through the normally closed shunt-circuit above traced, which includes the field-magnet 28 of the motor and the resistance-coils 30 and 31. As a result the said field-magnet 28 will be constantly energized and there will be a difference of potential between the ends of both the resistance-coils 30 and 31. Whenever the field-coils 1 and 2 are energized by the flow of current from the line therethrough, the movable part 8 will be turned against the action of the counterbalancing device 16—say in the direction of rotation of the hands of a clock. This will bring the conducting-rod 12 into engagement with the contact 13 and close a secondary circuit through the armature 37 of the motor 20 over the following course, the current-flow being due to the difference of potential at the ends of the resistance-coil 30: wire 34, contact-point 13, rod 12, wire 38, brushes 36, armature 37, and wire 35 to the opposite end of coil 30. The motor 20 is thereby thrown into operation in one direction and rotates the shaft 19, so as to draw the collar or nut 18 toward the motor and increase the tension of the counterbalancing device or spring 16. The operation of the motor in this direction continues until the collar or nut 18 has been moved to such a point that the increased tension of the spring 16 will overcome the action of the current on the armature or moving part 8 and restore the latter to its normal zero position. When this is done, the rod 12 will occupy a position between the contacts 13 and 14 and the circuit just traced through the armature of the motor will be broken. The result is that the motor will be thrown out of operation and the shaft 19 cease to rotate. The extent of movement of the spring 16 will be recorded by the pencil 21 on the rotating drum 22, and the degree of movement of the shaft 19, which will bear the same ratio to the extent of movement of the spring 16, will be indicated by the hand or pointer 25 on the dial 26. The indicating and recording devices will visually show and mechanically register the energy or other value of the current flowing through the instrument. Now if the energy or other value of the current to be measured increases the armature 8 will be again turned against the action of the spring 16 in the same direction as before and contact again made between the conducting-rod 12 and the contact-point 13. The result of this will be that the motor 20 will be again operated in the same direction as before, so as to increase the tension of the counterbalancing device 16 to such an extent as to return the moving part 8 to its normal zero position and the rod 12 to its normal position between the contacts 13 and 14. If, however, the energy of the current to be measured decreases, the force exerted by the counterbalancing device 16 will be greater than that exerted by the current on the armature or moving part 8. In consequence the armature or moving part 8 will be moved by the counterbalancing device 16 in a direction opposite to that of the movement of the hands of a watch, and the conducting-rod 12 will be moved to the right, so as to be brought into engagement with the contact-point 14. A new secondary circuit is then closed through the armature 37 of the motor over the following path: wire 35, brushes 36, armature 37, wire 38, and rod 12 to contact-point 14, and thence through wire 33 to the opposite side of resistance-coil 31. The current through this circuit is supplied by reason of the difference of potential at the ends of the coil 31. It will be noted that the circuit through the field-magnet 28 is in the same direction as it was when the energy of the current was on the increase, but that the flow of current through the armature 37 is directly opposite that through which it passed when the energy of the current was on the increase. As a result the motor 20 is reversed and the shaft 19, operated thereby, is turned in a direction opposite to that at which it was formerly turned. The collar or nut 18 is therefore moved away from the motor 20 and the tension of the spring 16 or other counterbalancing device relieved. When the tension of the spring 16 has been sufficiently relieved, so that the same just counterbalances the action of the current on the armature or moving part 8, the said armature or moving part is returned to its normal zero position, and the rod 12 is moved to a point between the contacts 13 and 14. This movement of the collar or nut 18 and of the shaft 19, which carries the worm 23, will be recorded on the cylinder 22 and indicated by the hand or pointer 25 on the dial 26.

It will thus be seen that according to my invention means are provided for normally maintaining the armature or other movable part of the meter at its zero-point, the variable force necessary for this purpose being the force which is measured and being equivalent to the energy or other value of the current to be measured. It will also be noted that through the action of the movable part 8 of the meter the motor which controls the tension of the counterbalancing device is automatically thrown into and out of operation and reversed. It will also be noted that means are provided in an instrument of this kind for providing a visual indication, as well as a record of the energy or other value of the current flowing through the instrument.

According to the construction shown in Figs. 1 and 2 of the drawings the motor is actuated by the current taken directly from the line, the energy or other value of which is to be measured. Instead of taking the current from the line and passing the same through the motor 20 in one direction or the other said motor may be actuated from an independent source of supply of electric current. An arrangement by which this may be done is illustrated in Fig. 3 of the drawings, in which a battery 39 is shown, having one pole connected with the contact-point 13 through a wire $34^a$ and the other pole connected with the contact-point 14 through the wire $33^a$. The conducting-rod 12, which is connected, as before, with the armature or movable part of the meter, is located between the contacts 13 and 14 and is connected through the wire $38^a$ with the armature $37^a$ of a dynamo-electric motor $20^a$. From the armature $37^a$ leads a wire $35^a$ to the battery 39. The operation of this form of my invention is similar to that described and needs no detail description. It is sufficient to say that when contact is made between the rod 12 and the contact-point 13 the current flows from the battery 39 through the armature $37^a$ of the motor $20^a$ in one direction to operate the motor, and when contact is made between the rod 12 and the contact-point 14 the circuit is closed through the armature $37^a$ of the motor $20^a$ in the opposite direction, reversing the motor. The connections between the rod 12 and those between the motor $20^a$ and the other parts of the device are similar to those described with reference to the construction shown in Fig. 1 of the drawings.

Having now described my invention, what I claim as new, and desire to secure by Letters Patent, is—

1. In an electrical measuring instrument, a movable part acted upon by the current, a counterbalancing device for equalizing the action of the current thereon, a shaft and means movable longitudinally of said shaft for automatically increasing and decreasing the tension of said counterbalancing device on said movable part.

2. In an electrical measuring instrument, a movable part acted upon by the current, a counterbalancing device for equalizing the action of the current thereon, a shaft and means movable longitudinally of said shaft and thrown into operation by an increase or decrease in the energy or other value of the current to be measured for increasing and decreasing the tension of said counterbalancing device on said movable part.

3. In an electrical measuring instrument, a movable part acted upon by the current, a counterbalancing device for equalizing the action of the current thereon, a shaft, means movable longitudinally of said shaft for automatically increasing and decreasing the tension of said counterbalancing device on said movable part, and means for indicating the force exerted on said counterbalancing device.

4. In an electrical measuring instrument, a movable part acted upon by the current, a counterbalancing device for equalizing the action of the current thereon, a shaft, means movable longitudinally of said shaft for automatically increasing and decreasing the tension of said counterbalancing device on said movable part, and means for continuously recording the force exerted on said counterbalancing device.

5. In an electrical measuring instrument, a movable part acted upon by the current, a counterbalancing device for equalizing the action of the current thereon, a shaft, means movable longitudinally of said shaft for automatically increasing and decreasing the tension of said counterbalancing device on said movable part, means for indicating the force exerted on said counterbalancing device, and means for continuously recording said force.

6. In an electrical measuring instrument, a movable part acted upon by the current, a counterbalancing device for equalizing the action of the current thereon, a motor, a rotary shaft operated thereby, a longitudinally-movable connecting device actuated by said shaft and attached to said counterbalancing device for increasing and decreasing the tension thereof, and means thrown into operation by said movable part for operating said motor in one direction or the other, according as the energy or other value of the current increases or decreases.

7. In an electrical measuring instrument, a movable part acted upon by the current, a counterbalancing device for equalizing the action of the current thereon, a motor, a rotary shaft operated thereby, a longitudinally-movable connecting device actuated by said shaft and attached to said counterbalancing device for increasing and decreasing the tension thereof, means thrown into operation by said movable part for operating said motor in one direction or the other, according as the energy or other value of the current increases or decreases, and an indicating device connected with said motor and operated thereby.

8. In an electrical measuring instrument, a movable part acted upon by the current, a counterbalancing device for equalizing the action of the current thereon, a motor, a rotary shaft operated thereby, a longitudinally-movable connecting device actuated by said shaft and attached to said counterbalancing device for increasing and decreasing the tension thereof, means thrown into operation by said movable part for operating said motor in one direction or the other, according as the energy or other value of the current increases or decreases, and a recording device connected with said motor and operated thereby.

9. In an electrical measuring instrument, a movable part acted upon by the current, a counterbalancing device for equalizing the action of the current thereon, a motor, a rotary shaft operated thereby, a longitudinally-movable connecting device actuated by said shaft and attached to said counterbalancing device for increasing and decreasing the tension thereof, means thrown into operation by said movable part for operating said motor in one direction or the other, according as the energy or other value of the current increases or decreases, an indicating device, and a recording device, both connected with said motor and operated thereby.

10. In an electrical measuring instrument, a movable part acted upon by the current, a counterbalancing device for equalizing the action of the current on said movable part, a motor for increasing and decreasing the tension of said counterbalancing device, a threaded shaft connected with and operated by said motor, a threaded nut or collar on said shaft, movable longitudinally thereof and having said counterbalancing device connected with it, and means thrown into operation by said movable part for starting said motor in one direction or the other, according as the energy or other value of the current to be measured increases or decreases.

11. In an electrical measuring instrument, a movable part acted upon by the current, a counterbalancing device for equalizing the action of the current on said movable part, a motor for increasing and decreasing the tension of said counterbalancing device, a threaded shaft connected with and operated by said motor, a threaded nut or collar on said shaft, movable longitudinally thereof and having said counterbalancing device connected with it, means thrown into operation by said movable part for starting said motor in one direction or the other, according as the energy or other value of the current to be measured increases or decreases, and an indicating device connected with, and operated by, said shaft.

12. In an electrical measuring instrument, a movable part acted upon by the current, a counterbalancing device for equalizing the action of the current on said movable part, a motor for increasing and decreasing the tension of said counterbalancing device, a threaded shaft connected with, and operated by, said motor, a threaded nut or collar on said shaft, movable longitudinally thereof and having said counterbalancing device connected with it, means thrown into operation by said movable part for starting said motor in one direction or the other, according as the energy or other value of the current to be measured increases or decreases, and a recording device connected with, and operated by, said shaft.

13. In an electrical measuring instrument, a movable part acted upon by the current, a counterbalancing device for equalizing the action of the current on said movable part, a motor for increasing and decreasing the tension of said counterbalancing device, a threaded shaft connected with, and operated by, said motor, a threaded nut or collar on said shaft, movable longitudinally thereof and having said counterbalancing device connected with it, means thrown into operation by said movable part for starting said motor in one direction or the other, according as the energy or other value of the current to be measured increases or decreases, a worm secured to said shaft, a worm-wheel meshing therewith, and an indicating hand or pointer carried by said worm-wheel.

14. In an electrical measuring instrument, a movable part acted upon by the current, a counterbalancing device for equalizing the action of the current on said movable part, a motor for increasing and decreasing the tension of said counterbalancing device, a threaded shaft connected with, and operated by, said motor, a threaded nut or collar on said shaft, movable longitudinally thereof and having said counterbalancing device connected with it, means thrown into operation by said movable part for starting said motor in one direction or the other, according as the energy or other value of the current to be measured increases or decreases, a rotating drum or cylinder, and a marking device carried by said collar or nut and bearing against said drum.

15. In an electrical measuring instrument, a movable part acted upon by the current, a counterbalancing device for equalizing the action of the current on said movable part, a motor for increasing and decreasing the tension of said counterbalancing device, a threaded shaft connected with, and operated by, said motor, a threaded nut or collar on said shaft, movable longitudinally thereof and having said counterbalancing device connected with it, means thrown into operation by said movable part for starting said motor in one direction or the other, according as the energy or other value of the current to be measured increases or decreases, an indicating device, and a recording device, both connected with, and operated by, said shaft.

16. In an electrical measuring instrument, a movable part acted upon by the current, a spring connected thereto for overcoming the torque of the same and for maintaining said movable part normally at its zero-point, a shaft thrown into operation by an increase in the energy or other value of the current to be measured and longitudinally-movable means on said shaft for increasing and decreasing the tension of said spring.

17. In an electrical measuring instrument, a movable part acted upon by the current, a spring connected thereto for overcoming the torque of the same and for maintaining said movable part normally at its zero-point, a motor, a shaft operated thereby, means thrown into operation by said movable part for starting said motor in one direction or the other and means movable longitudinally of and by said shaft for increasing or decreasing the tension of said spring.

18. In an electrical measuring instrument, a movable part acted upon by the current, a counterbalancing device for equalizing the action of the current on said movable part, a reversible electric motor, a shaft operated thereby, a connecting device movable longitudinally of said shaft and attached to said counterbalancing device for increasing and decreasing the tension thereof, a circuit through said motor, and means thrown into operation by said movable part for closing the circuit through said motor in one direction or the other, according as the energy or other value of the current to be measured increases or decreases.

19. In an electrical measuring instrument, a movable part acted upon by the current, a conducting rod or arm connected with said movable part and operated thereby, electric contacts between which said rod is mounted, a counterbalancing device for equalizing the action of the current on said movable part and thereby normally maintaining said movable part at its zero position and said rod at a point intermediate said contacts, a reversible electric motor, a shaft operated thereby, a connecting device longitudinally movable on said shaft and attached to said counterbalancing device for increasing and decreasing the tension thereof, and a circuit through said motor adapted to be closed in one direction or the other by the engagement of said rod with one or the other of said contacts as the energy or other value of the current through the instrument increases or decreases.

20. In an electrical measuring instrument, a movable part acted upon by the current, a conducting rod or arm connected with said movable part and operated thereby, electric contacts between which said rod is mounted, a counterbalancing device for equalizing the action of the current on said movable part and thereby normally maintaining said movable part at its zero position and said rod at a point intermediate said contacts, a reversible electric motor, a shaft operated thereby, a connecting device movable longitudinally of and by said shaft and attached to said counterbalancing device for increasing and decreasing the tension thereof, a circuit through said motor adapted to be closed in one direction or the other by the engagement of said rod with one or the other of said contacts as the energy or other value of the current through the instrument increases or decreases, and indicating mechanism connected with, and operated by, said motor.

21. In an electrical measuring instrument, a movable part acted upon by the current, a conducting rod or arm connected with said movable part and operated thereby, electric contacts between which said rod is mounted, a counterbalancing device for equalizing the action of the current on said movable part and thereby normally maintaining said movable part at its zero position and said rod at a point intermediate said contacts, a reversible electric motor, a shaft operated thereby, a connecting device movable longitudinally of and by said shaft and attached to said counterbalancing device for increasing and decreasing the tension thereof, a circuit through said motor adapted to be closed in one direction or the other by the engagement of said rod with one or the other of said contacts as the energy or other value of the current through the instrument increases or decreases, and recording mechanism connected with, and operated by, said motor.

22. In an electrical measuring instrument, a movable part acted upon by the current, a conducting rod or bar connected therewith and operated thereby, contacts between which said rod is mounted, a counterbalancing device for equalizing the action of the current on said movable part and thereby normally maintaining said movable part at its zero-point and said rod at a point intermediate said contacts, a reversible electric motor for increasing and decreasing the tension of said counterbalancing device, a shunt-circuit from the line, including the field-magnets of said motor and two resistance-coils, circuit connections between said contacts and said shunt-circuit at points, respectively above and below said coils, and circuit connections between said conducting-rod, the armature of said motor, and said shunt-circuit, at a point intermediate said coils, whereby the circuit through said armature may be closed in one direction or the other by the engagement of said rod with one or the other of said contacts upon an increase or decrease in the energy or other value of the current through the instrument.

23. In an electrical measuring instrument, a movable part acted upon by the current, a conducting rod or bar connected therewith and operated thereby, contacts between which said rod is mounted, a counterbalancing device for equalizing the action of the current on said movable part and thereby normally maintaining said movable part at its zero-point and said rod at a point intermediate said contacts, a reversible electric motor for increasing and decreasing the tension of said counterbalancing device, a shunt-circuit from the line, including the field-magnets of said motor and two resistance-coils, circuit connections between said contacts and said shunt-circuit at points respectively above and below said coils, circuit connections between said conducting-rod, the armature of said motor, and said shunt-circuit, at a point intermediate said coils, whereby the circuit through said armature may be closed in one direction or the other by the engagement of said rod with one or the other of said contacts upon an increase or decrease in the energy or other value of the current through the instrument, and indicating mechanism connected with and operated by said motor.

24. In an electrical measuring instrument, a movable part acted upon by the current, a conducting rod or bar connected therewith and operated thereby, contacts between which said rod is mounted, a counterbalancing device for equalizing the action of the current on said movable part and thereby normally maintaining said movable part at its zero-point and said rod at a point intermediate said contacts, a reversible electric motor for increasing and decreasing the tension of said counterbalancing device, a shunt-circuit from the line, including the field-magnets of said motor and two resistance-coils, circuit connections between said contacts and said shunt-circuit at points respectively above and below said coils, circuit connections between said conducting-rod, the armature of said motor, and said shunt-circuit, at a point intermediate said coils, whereby the circuit through said armature may be closed in one direction or the other by the engagement of said rod with one or the other of said contacts upon an increase or decrease in the energy or other value of the current through the instrument, and recording mechanism connected with, and operated by, said motor.

In testimony whereof I have hereunto set my hand in presence of two subscribing witnesses.

VITTORIO ARCIONI.

Witnesses:
ANGELO LITI,
MAURIZO CIRONE.